United States Patent
Wu et al.

(10) Patent No.: US 11,098,220 B2
(45) Date of Patent: Aug. 24, 2021

(54) ONE PACK LOW TEMPERATURE CURE COATING COMPOSITIONS

(71) Applicant: ALLNEX IP S.À.R.L., Luxembourg (LU)

(72) Inventors: Kuang-Jong Wu, Easton, CT (US); John Colin Brogan, Stamford, CT (US); Lon-Tang Wilson Lin, Bethel, CT (US)

(73) Assignee: ALLNEX NETHERLANDS B.V., Bergen op Zoom (NL)

( * ) Notice: Subject to any disclaimer, the term of this patent is extended or adjusted under 35 U.S.C. 154(b) by 435 days.

(21) Appl. No.: 14/763,662

(22) PCT Filed: Jan. 28, 2014

(86) PCT No.: PCT/US2014/013290
§ 371 (c)(1),
(2) Date: Jul. 27, 2015

(87) PCT Pub. No.: WO2014/120644
PCT Pub. Date: Aug. 7, 2014

(65) Prior Publication Data
US 2015/0361295 A1 Dec. 17, 2015

Related U.S. Application Data

(60) Provisional application No. 61/758,411, filed on Jan. 30, 2013.

(51) Int. Cl.
*C09D 133/14* (2006.01)
*C08G 12/42* (2006.01)
(Continued)

(52) U.S. Cl.
CPC .......... *C09D 133/14* (2013.01); *B05D 3/007* (2013.01); *C08G 12/427* (2013.01); *C09D 161/32* (2013.01)

(58) Field of Classification Search
CPC .... C09D 133/14; C09D 161/32; B05D 3/007; C08G 12/427
See application file for complete search history.

(56) References Cited

U.S. PATENT DOCUMENTS 3,813,371 A * 5/1974 Bozer et al. ............ C08L 71/14
525/352
4,351,871 A * 9/1982 Lewis ..................... B44C 1/172
156/230
(Continued)

FOREIGN PATENT DOCUMENTS

FR    2 327 356    5/1977
GB    1 561 330    2/1980
(Continued)

OTHER PUBLICATIONS

International Search Report dated Apr. 29, 2014 in International (PCT) Application No. PCT/US2014/013290.
(Continued)

*Primary Examiner* — Robert S Walters, Jr.
(74) *Attorney, Agent, or Firm* — Wenderoth, Lind & Ponack, L.L.P.

(57) ABSTRACT

This invention relates to coating compositions comprising at least one aminoplast crosslinker resin A, binder resins B that have active hydrogen functionality, and a catalyst composition C, wherein the catalyst composition C is a mixture of an organic sulfonic acid C1, and an amine C2 which may be primary, secondary, or tertiary, and which must have a pKa value of not more than 10, and preferably not less than 4, a process for the preparation thereof, and to a method of use thereof.

12 Claims, 2 Drawing Sheets

(51) Int. Cl.
*C09D 161/32* (2006.01)
*B05D 3/00* (2006.01)

(56) References Cited

U.S. PATENT DOCUMENTS

| | | |
|---|---|---|
| 4,789,707 A | 12/1988 | Nishimura et al. |
| 5,691,002 A | 11/1997 | Oda et al. |
| 6,231,984 B1 * | 5/2001 | Horibe ................ B05D 7/586 |
| | | 428/416 |
| 7,619,019 B2 | 11/2009 | Drescher et al. |
| 9,796,805 B2 * | 10/2017 | Lin ........................ C08G 12/32 |
| 2005/0249958 A1 | 11/2005 | Kania et al. |
| 2007/0027040 A1 * | 2/2007 | Krull ...................... C10L 10/16 |
| | | 508/390 |

FOREIGN PATENT DOCUMENTS

| | | |
|---|---|---|
| JP | 54-120641 | 9/1979 |
| JP | 62-207373 | 9/1987 |
| JP | 2-142815 | 5/1990 |
| JP | 3-273072 | 12/1991 |
| JP | 7-278487 | 10/1995 |
| JP | 7-331166 | 12/1995 |
| JP | 11-76937 | 3/1999 |
| JP | 11-124501 | 5/1999 |
| JP | 2004-292577 | 10/2004 |
| WO | 2011/150164 | 12/2011 |

OTHER PUBLICATIONS

Littel et al., "Dissociation Constants of Some Alkanolamines at 293, 303, 318, and 333 K", Journal of Chemical and Engineering Data, vol. 35, No. 3, 1990, p. 276-277.

* cited by examiner

ONE PACK LOW TEMPERATURE CURE COATING COMPOSITIONS

FIELD OF THE INVENTION

This invention is directed to coating compositions comprising aminoplast resin crosslinkers, binder resins that have active hydrogen functionality, and a catalyst. The invention is also directed to a process for the preparation of the said coating compositions, and to a method of use thereof to form coating films on flexible or rigid substrates.

BACKGROUND OF THE INVENTION

Many fully alkylated, or etherified, formaldehyde melamine crosslinkers having a low content of imino groups, work well when formulated as two pack coating systems, particularly if used for low temperature bake coating applications. A disadvantage of such formulations is, however, that the two pack systems only have less than eight hours of pot life due to the viscosity increase and chemical reaction of the aminoplast resin crosslinker and the active hydrogen-functional binder resin, after mixing these two components, in the presence of an acid catalyst which is most preferably selected from organic sulfonic acids. A common way to extend the pot life is to use amines to block the acid catalysts by formation of salts which themselves are not catalysts. It is possible to formulate coating compositions, the so-called "one pack coating compositions" that do not require mixing only immediately before use, but have a pot life that allows to store the ready-made mixture of active hydrogen-functional binder resin, aminoplast resin crosslinker, and catalyst for more than eight hours before application thereof onto a substrate, without premature viscosity rise or gelation due to partial reaction which makes the mixed coating composition unfit for use. These amine salts may be cleaved by heating, under evaporation of the amine, and regeneration of the acid. However, the temperature for cleavage of these amine salts is usually high, such as at least 120° C., which makes such coating compositions not eligible for low temperature curing applications such as for substrates like paper, cardboard, leather, wood, or thermoplastic parts.

Low temperature-bake melamine-formaldehyde resin cured coating compositions have been proposed in U.S. Pat. No. 7,619,019. These coating compositions can be cured at temperatures from 60° C. to 135° C., particularly below 105° C. to form durable coatings for plastic substrates. These coating compositions comprise one or more low-temperature curing alkyl-etherified aminoplast resins, one or more hydroxyl group containing binder resins, and one or more sulfonic acid catalysts that are blocked by salt formation with one or more volatile amines which are preferably secondary amines with relative evaporation rate (RER) of from 50 to 500, particularly preferred is di-n-propylamine, $(CH_3\text{—}CH_2\text{—}CH_2\text{—})_2NH$ having an RER of 157. It was found, however, in the experiments that have led to the present invention, that this preferred amine, and also other secondary amines that are designated as preferred such as morpholine (molar mass 87.12 g/mol; vapor pressure at 20° C. in mm of Hg: 7; RER=87.12×7/11.6=52.6) or N-methyl-hexylamine (molar mass 115.22 g/mol, vapor pressure at 20° C. in mm of Hg: 5.5; RER=115.22×5.5/11.6=54.6) do not lead to acceptably short curing times. The obsolete unit "mm Hg" which once had been used for the definition of the relative evaporation rate (as the product of the molar mass of a chemical compound in g/mol, and its vapor pressure at 20° C., in mm Hg, divided by 11.6) is converted to the SI unit "Pa" (Pascal) as: 1 mm Hg=133.32 Pa=1.3332 hPa. It had further been found that the range for the ratio of the amount of substance of volatile amines to the amount of substance of the unblocked acid catalysts, referred to therein as "mole ratio", of from 0.02 mol/mol to 0.09 mol/mol as claimed in claim 1 of this patent apparently causes a lack of storage stability which leads to undesirable rise in viscosity, and loss of curability during storage.

It was therefore an object of the invention to provide one-pack coating compositions comprising aminoplast resin crosslinkers, binder resins that have active hydrogen functionality, and a catalyst system that can be used at low curing temperatures, and still have a pot life of more than eight hours at room temperature. In the investigations that have led to the present invention, it has been found that low pKa amines can be used to block the acid catalyst to prevent the viscosity change and gelation, and crosslinker compositional change, and to formulate the combination of aminoplast resin crosslinkers, binder resins that have active hydrogen functionality, and acid catalyst as a one package coating system with short curing times. This new one pack coating system can cure adequately at a temperature below 100° C., particularly in a temperature range of from 60° C. to 90° C. which is the preferred range for sensitive substrates, such as goods made from thermoplastic polymers, hereinafter referred to as "plastic" and wood. It also can replace the so-called high bake coating systems which need a curing temperature of at least 100° C. to save significant energy cost.

Low $pK_a$, as used herein, is a range of from 4 to 10, preferably from 4.2 to 9.9, and particularly preferred, from 4.5 to 9.8, for the logarithm, multiplied by −1, of the constant $K_a$ describing the dissociation equilibrium of the conjugate acid of the amine, viz., the ammonium compound.

It was found that a coating system formulated with di-n-propylamine with $pK_a$ of 11.0 did not cure adequately at 90° C., whereas other amines were found to cure fast below 90° C., which amines are not limited to having secondary amino groups, and RER of at least 50. Useful amines can be primary aromatic amines, e.g. 4-ethylaniline (having a RER=1, and pKa=4.6), or a primary aliphatic amine such as 2-amino-2-methylpropanol (with a value for RER of 8 and pKa of 9.8).

SUMMARY OF THE INVENTION

The invention is therefore directed to coating compositions comprising aminoplast resin crosslinkers A, binder resins B that have active hydrogen functionality, and a catalyst composition C, wherein the catalyst composition C is a mixture of an organic sulfonic acid C1, and an amine C2 which may be primary, secondary, or tertiary, and which must have a pKa value of not more than 10, and preferably not less than 4.

The invention is also directed to a process for preparing a coating composition, which process comprises
  in the first step, preparing a catalyst composition C by mixing an organic sulfonic acid C1, optionally dissolved in an organic solvent selected from alcohols, e.g. ethanol, isopropanol, butanol, isobutanol, aromatic hydrocarbon solvents, e.g. xylenes, high flash naphtha, and esters, and ketones, with an amine C2 which may be a primary, a secondary, or a tertiary amine, and which must have a pKa value of not more than 10, and preferably not less than 4,
  in an optional second step, providing a binder resin B dissolved in an inert organic solvent L which is selected from the group consisting of aromatic hydrocarbons or mixtures thereof, aliphatic esters, aliphatic ethers, aliphatic ketones, and aliphatic linear or branched alcohols, admixing the catalyst composition C to an aminoplast crosslinker A, to form a mixture AC, and in the third step, admixing the mixture AC to a binder resin B, optionally under addition of a solvent L as defined supra, or to the solution of the second step, of the binder resin B in an inert solvent L, to form a one pack coating composition.

The invention is also directed to a method of using the coating composition thus prepared to provide a substrate with a coating film, wherein the substrate may a metal or also preferably, a heat-sensitive substrate, by applying a layer of the coating composition onto at least one surface of the substrate, and curing the layer by exposing the coated substrate to a temperature of from 50° C. to not more than 120° C.

DETAILED DESCRIPTION OF THE PREFERRED EMBODIMENTS

The aminoplast crosslinker resin A preferably comprises at least one at least partially etherified reaction product of an aminotriazine, preferably melamine, and formaldehyde wherein the ratio of the amount of substance $n(CH_2O)$ of combined formaldehyde to the amount of substance $n(Trz)$ of aminotriazine is, in the case of melamine, in the range of from 4.5 mol/mol to 6.2 mol/mol, the ratio of the amount of substance $n(RO)$ of alkyl ether groups in the aminoplast crosslinker resin to the amount of substance $n(Trz)$ of aminotriazine is, in the case of melamine, in the range of from 4 mol/mol to 6.0 mol/mol, and the mass fraction of monomers is in the range of from 30% to 65%, calculated as the ratio of the mass $m(1)$ of monomer to the mass $m(CR)$ of crosslinker resin, excluding solvents, additives, and catalysts. As is usual in the field, a monomer of an aminotriazine-based aminoplast resin is a chemical entity having exactly one triazine ring in its molecule. In the case of an aminotriazine having only two amino groups, such as benzoguanamine or acetoguanamine, these values are two thirds of the values stated supra. The amount of substance $n(>NH)$ of imino groups >NH in the at least partially etherified reaction product of an aminotriazine and formaldehyde as defined supra is preferably not more than 0.3% of the amount of substance of triazine groups, in the said at least partially etherified reaction product of aminotriazine and formaldehyde. If more imino groups, such as 0.4%, are present, this apparently has an adverse effect on the cure response, unduly extending the time needed for curing of the coating composition.

Combined formaldehyde, in the context of this invention, means any methylene group derived from formaldehyde directly or indirectly bound to an aminoplast former molecule, in this case, aminotriazine or specifically, melamine, as one of the following groups: an oligoacetal (>N—$CH_2$—[O—$CH_2$]$_n$—O—H), having n+1 molecules of formaldehyde, an alkoxyoligoacetal (>N—$CH_2$—[O—$CH_2$]$_n$—OR), having n+1 molecules of formaldehyde, an alkoxymethyl (>N—$CH_2$—OR), having 1 molecule of formaldehyde, a methylene ether bridge (>N—$CH_2$—O—$CH_2$—N<), having 2 molecules of formaldehyde, a methylene bridge (>N—$CH_2$—N<), having 1 molecule of formaldehyde, and a N-methylol group >N—$CH_2OH$, having 1 molecule of formaldehyde.

The content of combined formaldehyde is calculated from the measured contents of total and free formaldehyde, and analytical determination of the nitrogen content, and is expressed in the case of melamine-formaldehyde resins as the ratio of the amount of substance of methylene groups bound to oxygen or nitrogen atoms, $n(CH_2)$, to the amount of substance of melamine-derived moieties $n(Mel)$, where Mel stands for a hexavalent moiety obtained by removing all aminic hydrogen atoms from a melamine molecule.

In one preferred embodiment, the aminoplast crosslinker resin may comprise two or more of the reaction products as defined supra, which may differ from each other in at least one of the three characteristics mentioned.

If a mixture of two aminoplast crosslinker resins is used, it is preferred that one of the aminoplast crosslinker resins, A1, comprises at least one at least partially etherified reaction product of melamine and formaldehyde wherein the ratio of the amount of substance $n(CH_2O)$ of combined formaldehyde to the amount of substance $n(Mel)$ of melamine is in the range of from 5.55 mol/mol to 6.2 mol/mol, the ratio of the amount of substance $n(RO)$ of alkyl ether groups in the aminoplast crosslinker resin A to the amount of substance $n(Mel)$ of melamine is in the range of from 5.0 mol/mol to 5.6 mol/mol, and the mass fraction of monomers is in the range of from 35% to 55%, calculated as the ratio of the mass $m(1)$ of monomer to the mass $m(A)$ of the aminoplast crosslinker resin A1, excluding solvents, additives, and catalysts.

The second of the aminoplast crosslinker resins, A2, comprises at least one at least partially etherified reaction product of melamine and formaldehyde wherein the ratio of the amount of substance $n(CH_2O)$ of combined formaldehyde to the amount of substance $n(Mel)$ of melamine is in the range of from 5.75 mol/mol to 6.5 mol/mol, the ratio of the amount of substance $n(RO)$ of alkyl ether groups in the aminoplast crosslinker resin A to the amount of substance $n(Mel)$ of melamine is in the range of from 4.5 mol/mol to 5.9 mol/mol, and the mass fraction of monomers is in the range of from 55% to 95%, calculated as the ratio of the mass $m(1)$ of monomer to the mass $m(A)$ of the aminoplast crosslinker resin A2, excluding solvents, additives, and catalysts.

In these coating compositions where a mixture of two aminoplast crosslinker resins is used, it is preferred that the ratio of the mass $m(A1)$ of the aminoplast crosslinker resin A1 to the mass $m(A2)$ of the aminoplast crosslinker resin A2 is from 5:5 to 9:1.

The alkoxy groups of the aminoplast crosslinker resin A are linear or branched aliphatic monovalent groups having an oxy function, and from one to twelve, preferably from one to six, carbon atoms in the group, and are preferably selected from the group consisting of methoxy $CH_3O$—, ethoxy $CH_3$—$CH_2$—O—, n-propoxy $CH_3$—$CH_2$—$CH_2$—O—, isopropoxy $(CH_3)_2CH$—O—, n-butoxy $CH_3$—$CH_2$—$CH_2$—$CH_2$—O—, and isobutoxy $(CH_3)_2CH$—$CH_2$—O— groups. The alkoxy groups may all be the same in one aminoplast resin molecule, such as preferably, methyl, n-butyl, or iso-butyl, but it is also possible to use the so-called "mixed ethers" which have two or more different alkoxy groups in one aminoplast resin molecule, or in a mixture of aminoplast resin molecules. Preferred are mixed ethers comprising methyl and ethyl groups, methyl and n-butyl groups, and methyl an isobutyl groups.

The binder resins B are active hydrogen functional polymers, preferably having hydroxyl —OH, carboxyl —COOH, or carboxamide —CONH$_2$ functionalities, particularly preferably, they are hydroxy-functional polymers such as alkyd resins, polyester resins, acrylic resins, acrylic-alkyd hybrids or acrylic-polyester hybrids, polyether polymers, polyolefin polymers, or polyurethane polymers which may be selected from the group consisting of polyether-polyurethanes, polyester-polyurethanes, polycarbonate-polyurethanes, and polyolefin-polyurethanes, in the form of their solutions in organic solvents, and also, in the form of aqueous dispersions. It is preferred to use hydroxy-functional polyesters, or acrylic resins based on a hydroxy-functional olefinically unsaturated monomer selected from the group consisting of hydroxyalkyl acrylate and hydroxyalkylmethacrylate, and optionally, an olefinically unsaturated carboxylic acid, and also optionally, further olefinically unsaturated monomers, and also, hybrids of polyesters and acrylic resins such as those made by polymerising olefinically unsaturated monomers, particularly acrylic monomers, in the presence of a preformed polyester. Particularly preferred are such hydroxy-functional resins that have primary hydroxyl groups, where it is especially preferred that a fraction of at least 50% of all hydroxyl groups present in the polymer are primary. The glass transition temperature of these hydroxy-functional polymers, measured in the usual way by differential scanning calorimetry in the second heating cycle, is preferably not more than 45° C. These hydroxy-functional polymers may preferably be used in the form of a solution in an organic solvent L as defined supra, or a mixture of two or more such solvents.

It has been found in the experiments underlying this invention that a combination of crosslinker resin compositions A of the present invention comprising the catalyst compositions C, with the hydroxy-functional binder polymers B mentioned supra provides a satisfactory cure response already at temperatures ranging from about 50° C. to 100° C., particularly at temperatures from 55° C. to 90° C., or from 60° C. to 80° C. These low cure temperatures allow coating of heat-sensitive substrates, but can, of course, be used with any other substrate and contribute to energy saving by allowing lower cure temperatures.

The method of use of the coating compositions of the present invention comprises therefore
  admixing an amine C2 having a pKa value of not more than 10, to an organic sulfonic acid C1, to obtain a catalyst composition C,
  providing a binder resin B which is preferably a hydroxyfunctional polymer, preferably in the form of a solution in an inert solvent L as defined supra,
  adding thereto the catalyst composition C to from a mixture of B and C,
  mixing this mixture of B and C with at least one aminoplast crosslinker resin A as described supra, under mixing, to provide a coating composition, and
  coating a substrate with this coating composition to prepare a coating film on the substrate, and
  curing the coating film by applying heat,
wherein the curing temperature is between 50° C. and 100° C.

While it is, of course, possible to use higher curing temperatures, thereby increasing the crosslinking speed, it is of particular advantage to restrict the curing temperature to a value not exceeding 100° C. as this allows to use the crosslinker composition according to the present invention for use with temperature-sensitive substrates, particularly wood, fabricated or industrial wood, paper, cardboard, textiles, and leather, as well as plastics, particularly thermoplastic materials which do not have an elevated heat distortion temperature. Of course, using this coating composition to coat other substrates that are not temperature-sensitive is also useful as the lower curing temperatures afforded by the coating compositions according to the present invention contribute to saving energy, such as in the filed of general industrial coatings or automotive OEM coatings.

The preparation of coating compositions usually comprises the steps of charging a preferably hydroxyl functional binder resins B, preferably in the form of a solution, and admixing thereto the aminoplast crosslinker resin A, hereinafter also referred to as "cross-linker A", or a mixture of more than one such crosslinkers A, and optionally, before, during or after addition of the crosslinkers, admixing further additives, or pigments or both. The catalyst composition C may preferably be charged together with, or admixed to, the binder resin B, or added to the crosslinker A, or may be added after mixing the crosslinker A and the binder resin B.

The organic sulfonic acid catalysts C1 may be an aliphatic and/or aromatic sulfonic acid having at least one sulfonic acid group, —SO$_3$H, bound to an aliphatic or aromatic carbon atom, in a molecule. Particularly preferred are methane sulfonic acid, toluene sulfonic acid, dodecylbenzene sulfonic acid, dinonylnaphthalene sulfonic acid, and dinonylnaphthalene disulfonic acid, or mixtures of these.

Preferred amines C2 are those having a pKa value between 4 and 10, particularly primary aromatic amines such as 4-chloroaniline (RER=0.5; pKa=4.0), aliphatic-aromatic amines such as alkylaryl-amines or N-alkylarylamines, examples being p-ethylaniline (RER=1; pKa=4.6), 4-picoline (RER=32; pKa=6.0), 2,6-lutidine (RER=22; pKa=6.6), and 2,4,6-collidine (RER=19; pKa=7.4), and N-ethyl aniline (RER=3; pKa=5.1), and aliphatic amines such as ethanolamine (RER=2; pKa=9.5), N-methylethanolamine (RER=3.4; pKa=9.95), and 2-methyl-2-aminoethanol (RER=8, pKa=9.8). It is further preferred that the amines C2 have a value for the relative evaporation rate RER of less than 50, particularly preferred, not more than 45, and especially preferred, not more than 40.

A preferred range for the ratio between the amount of substance of alkoxymethyl groups in the crosslinker resin composition to the amount of substance of hydroxyl groups in the hydroxy-functional binder resin is from 1.2 mol/mol to 2.5 mol/mol.

The main advantages of this invention are
  Lowering of the current OEM cure temperature from currently 120° C. to 140° C. to the level of from 60° C. to 90° C. which can save a significant amount of energy required to cure, compared to the current system,
  Applicability for heat-sensitive substrates, such as various plastic substrates which are mainly coated by two packages urethane systems, for wood and fabricated wood, and for textiles, leather, paper and cardboard,
  Elimination of the need to use polyisocyanates, and thus obviating their toxicity problems,
  Ease of use compared to two pack coating systems based on isocyanate crosslinkers.

The applications areas include automotive OEM clear coat, plastic coatings, wood coatings, and general industrial coatings.

The invention is further illustrated by the following examples which are not intended to limit the scope of the invention.

The following physicochemical properties are used in the examples, and in the specification text:

The hydroxyl number won is defined according to DIN EN ISO 4629 (DIN 53 240) as the ratio of the mass of potassium hydroxide $m_{KOH}$ having the same number of hydroxyl groups as the sample under examination, and the mass $m_B$ of that sample (mass of solids in the sample for solutions or dispersions); the customary unit is "mg/g".

The acid number $w_{Ac}$ is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

Molar mass averages can conveniently be determined by size-exclusion (or gel permeation) chromatography, with calibration against polystyrene standards. Molar mass measurements were conducted using crosslinker resin samples (0.5 g) dissolved in tetrahydrofuran (20 ml), elution speed was 1 ml/min.

The mass fraction of solids $w_s$ in a solution or dispersion is defined as the ratio of the mass of solids $m_s$ in a sample B, and the mass $m_B$ of the sample, which in this case is the sum of the mass of solids $m_s$, and the mass $m_V$ of the solvent or dispersant V.

The dynamic viscosity is measured according to DIN EN ISO 3219 at 23° C., and a shear rate of 100 s$^{-1}$.

Glass transition temperatures are conveniently measured by differential scanning calorimetry, and recording the temperature at the inflection point(s) during the second heating cycle.

The mass fraction of solids $w_s$ for melamine-based crosslinker resins ("foil solids") is determined by measuring the loss of mass $\Delta m$ of a sample B having a mass $m_B$ of approximately 1 g which is spread by folding the foil over on itself, thereby compressing the sample to provide a thin film having a diameter of from 4 cm to 7 cm. The foil is the opened up, and placed in a circulating air oven at 45° C. for forty-five minutes, at the end of which time it is removed, and reweighed to determine the loss of mass, as $W_s = (m_B - \Delta m)/m_B$.

The amount-of-substance fraction $x_i$ (also referred to as "mole fraction") of a chemical compound i in a mixture comprising m individual chemical compounds j, or of a moiety i in a chemical compound comprising m different moieties j, where j is natural number from 1 to m, is defined as $$x_i = n_i \bigg/ \sum_{j=1}^{m} n_j,$$

where $n_j$ is the amount of substance of chemical compound or moiety j, having the SI base unit "mol".

Similarly, in a melamine formaldehyde resin, characteristic quantities are the ratio of the amount of substance $n(CH_2)$ of combined formaldehyde, present as —$CH_2$— groups, as N-methylol functional groups >N—$CH_2$—OH or in acetal groups —O—$CH_2$—O— or an alkoxymethyl ether groups R—O—$CH_2$—, or in methylene groups >N—$CH_2$—N<, to the amount of substance n(Mel) of melamine derived moieties, $C_3N_3(N<)_3$, or the ratio of the amount of substance of alkyl ether or alkoxy groups, n(RO), to the amount of substance n(Mel) of melamine derived moieties, $C_3N_3(N<)_3$. These can be determined by $^{13}$C-NMR spectroscopy, and by titration (free formaldehyde), respectively. In other aminotriazine based aminoplast resins, melamine must be replaced by the appropriate aminotriazine.

Strength is the mass fraction $w_s$ of solute S in a solution L, measured as mass $m_s$ of solute divided my mass $m_L$, of solution, usually stated in "%" {1%=1 kg/(100 kg)=1 cg/g}.

The imino group content measured in "%" or "cmol/mol" by IR spectroscopy, is the ratio of the amount of substance n(NH) of imino groups (>N—H), and the amount of substance $n(C_3N_3)$ of triazine in the crosslinker resin.

EXAMPLES

Example 1

Synthesis of a Crosslinker Resin 1.1 Preparation of HMMM

A mixture was prepared from 126 g of melamine, 545 g of a mixture containing mass fractions of 55% of formaldehyde, 35% of methanol, and 10% of water, and 5 g of an aqueous sodium hydroxide solution having a mass fraction of sodium hydroxide of 10%, charged into a reaction vessel equipped with a stirrer and a reflux condenser, heated under stirring to 83° C. whereupon gentle reflux set in. The solution became clear and homogeneous. After heating to 87° C., the mixture became cloudy after fifteen minutes. 500 g of methanol were added, and heating under reflux was continued for ten more minutes. After cooling to ambient temperature (23° C.), the precipitate was collected by filtration, yielding 235 g of a solid material which was, according to the analysis, hexamethylol melamine ("HMM"). The solid HMM was transferred to another reaction vessel, 950 g of methanol and 50 g of nitric acid were added. The reaction mixture was stirred at ambient temperature for fifteen minutes, and finally neutralised by adding 150 g of powdered sodium hydrogencarbonate and 20 g of sodium carbonate. Methanol was removed by distillation under reduced pressure. Xylene was added, and the resulting suspension was filtered, the solid residue was isolated, washed with further xylene, and dried. 202 g of hexamethoxymethyl melamine ("HMMM") were obtained.

1.2 Oligomerisation of HMMM

Hexamethoxymethyl melamine (100 g) and methanol (6.2 g) were mixed. To this mixture, concentrated nitric acid was added in small portions to adjust the pH to 1.5. Reaction temperature was raised under stirring to 65° C. and the reaction mixture was held at these conditions for two hours. The progress of the reaction was then monitored with gel permeation chromatography until after two hours, the mass fraction of monomers was less than 50%. The mixture was then cooled to 40° C., and pH of the mixture was adjusted to 9 by addition of 25% strength aqueous sodium hydroxide solution. The volatile components (mainly methanol and water) were then stripped off under reduced pressure 15 hPa and heating up to 105° C. which temperature and pressure were then held for twenty minutes. The precipitate was then removed by filtration. The yield of oligomerised resin was 92 g with the following characteristics:

mass fraction of free formaldehyde: 0.08%;
imino groups content: 0.16%,
molar mass (number-average): 540 g/mol;
molar mass (mass average): 945 g/mol;
$n(CH_2)/n(Mel)$=5.81 mol/mol;
$n(OR)/n(Mel)$=5.23 mol/mol.

Example 2

Solvent-Borne Coating Compositions Based on Acrylic Resin A

Copolymer solution in a mixture of equal masses of xylene and butanol made by copolymerisation of methyl methacrylate, butyl methacrylate, 2-ethylhexyl acrylate, hydroxyethyl methacrylate, and acrylic acid, having a hydroxyl number of 80 mg/g, all of which are primary hydroxyl groups, an acid number of 12 mg/g, a glass transition temperature of 18° C., and a mass fraction of solids of 65%. A coating composition was prepared from this acrylic copolymer using the recipe of Table 1 (mass of components in g):

TABLE 1

Low Temperature Cure Coating Formulations

| Formulation | #1 | #2 |
|---|---|---|
| Acrylic Resin of Example 2 | 126.4 | 126.4 |
| Crosslinker Resin of Example 1.2 | 17.6 | 17.6 |
| Butyl Acetate | 15.0 | 15.0 |
| Xylenes | 15.0 | 15.0 |
| 1-Methoxy-2-propyl acetate (PMA) | 10.0 | 10.0 |
| Aromatic ® 100 Solvent | 5.0 | 5.0 |
| Dow Corning Paint Additive #57, 10% in PMA/Xylene | 1.0 | 1.0 |
| CYCAT 600 Catalyst | 2.8 | 2.8 |
| 4-Picoline | 0.7 | 0.0 |
| 2-Amino-2-methyl-1-propanol | 0.0 | 0.6 |
| Ethanol | 4.7 | 4.7 |

The term "xylenes" refers to the commercially available mixture which contains mass fractions of from 40% to 65% of m-xylene, from 15% to 20% of o-xylene, and from 15% to 25% of ethylbenzene, with a mass fraction of less than 20% of p-xylene. "Aromatic® 100", formerly also marketed under the trade name of "®Solvesso 100" by Exxon Mobile Chemical is a mixture of diallyl and trialkyl benzenes with nine or ten carbon atoms in the alkyl groups, CAS Nr. 64742-95-6. Dow Corning paint Additive #57 is a silicone glycol copolymer based slip, gloss, and wetting additive. CYCAT® 600 Catalyst is dodecylbenzene sulfonic acid dissolved in isopropanol, with a mass fraction of the acid of 70%.

Figure 1:
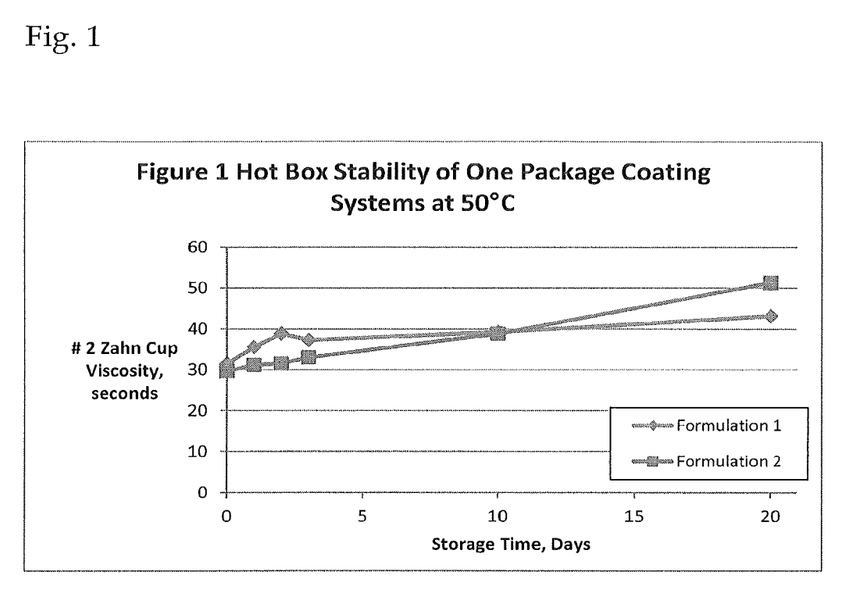
FIG. 1 shows the viscosity change after hot box storage of formulations of the examples.

The ready-made formulations had a hot box (50° C.) stability of at least twenty days in each case. As shown in FIG. 1 (appended), the viscosity change after hot box storage was less than twofold.

Figure 2:
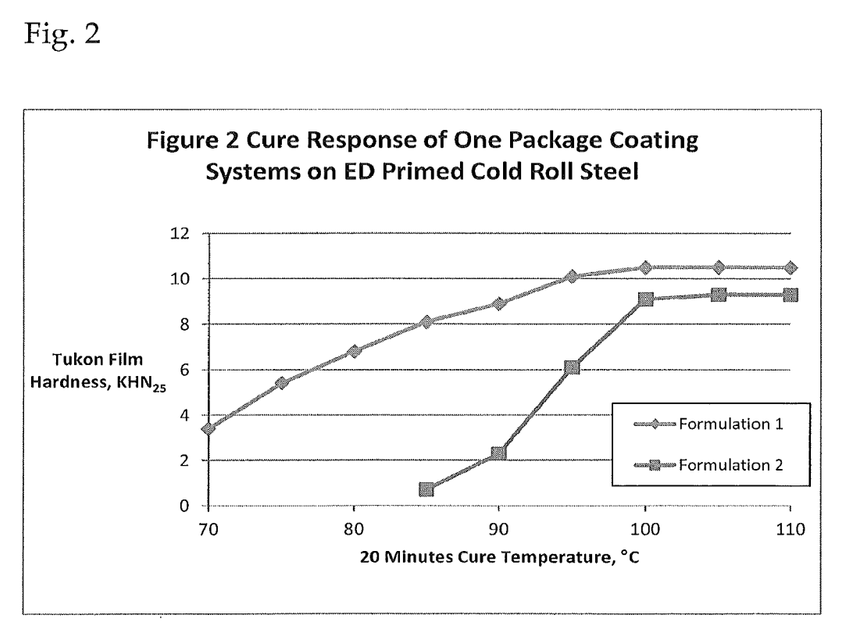
FIG. 2 shows the cure profiles of formulations of the examples.

The attached FIG. 2 shows the cure profiles of the formulations 1 and 2 of Table 3. Both started to cure at less than 95° C., for formulation 1, already at 70° C., the final hardness being reached after twenty minutes cure at 100° C.

Other sulfonic acid catalysts, such as CYCAT 500 (dinonyl naphthalene disulfonic acid) and CYCAT 4040 (p-Toluene sulfonic acid) also work well. Table 2 lists the formulations based on these two sulfonic acids (masses of components in g):

TABLE 2

Low Temperature Cure Coating Formulations

| Formulation | #3 | #4 |
|---|---|---|
| Acrylic Resin of Example 2 | 126.4 | 126.4 |
| Crosslinker Resin of Example 1.2 | 17.6 | 17.6 |
| Butyl Acetate | 15.0 | 15.0 |
| Xylenes | 15.0 | 15.0 |
| 1-Methoxy-2-propyl acetate (PMA) | 10.0 | 10.0 |
| Aromatic 100 | 5.0 | 5.0 |
| Dow Corning Paint Additive #57, 10% in PMA/Xylene | 1.0 | 1.0 |
| CYCAT 500 Catalyst | 4.4 | 0.0 |
| CYCAT 4040 Catalyst | 0.0 | 4.4 |
| 4-Picoline | 0.6 | 0.9 |
| Ethanol | 3.0 | 2.6 |

Figure 3:
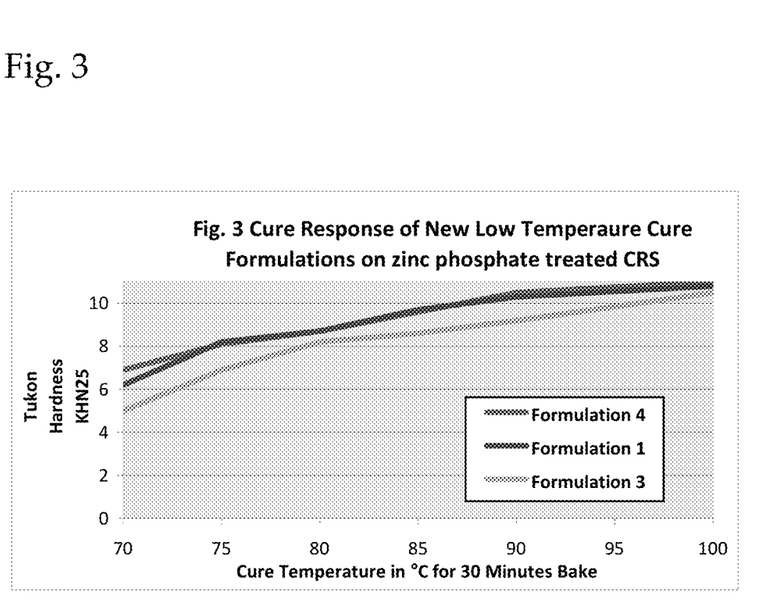
FIG. 3 shows additional cure profiles of formulations of the examples.

FIG. 3 (attached) shows the cure response of formulations based on 4-picoline blocked CYCAT® 500, 600, and 4040 catalysts. All these amine blocked sulfonic acid coating systems cure very well at low temperature. "CRS" are cold rolled steel sheets.

The one-pack low temperature cure system of this invention also works well for plastic substrates. Formulations have been used where all solvents which can attack plastic such as ester, ketone, and aromatic solvents have been replaced with an alcohol solvent. The formulation 5 (mass of the components in g) is the example listed in Table 3.

TABLE 3

Low Temperature Cure Coating Formulation

| Formulation | #5 |
|---|---|
| Acrylic Resin of Example 2 | 126.4 |
| Crosslinker Resin of Example 1.2 | 17.6 |
| n-Butanol | 96.6 |
| Dow Corning Paint Additive #57, 10% in PMA/Xylene | 1.0 |
| CYCAT 600 Catalyst | 2.8 |
| 4-Picoline | 0.6 |
| Ethanol | 4.7 |

Table 4 lists the plastic coating performances. The coating film passes the ten-days Cleveland humidity test which was conducted at 40° C. It maintains the best 5B adhesion. After five days of post cure, it had also passed the severe test "Water BABIES® Sunblock lotion 45SPF test", covered for twenty hours with a layer of sunblock lotion. The coating film only swells slightly and maintains the 5B adhesion.

TABLE 4

Plastic Coating Performance of Low Temperature Cure Coating Formulation

Substrate: corona discharge treated polycarbonate
Cure Schedule: 80° C.; 30 minutes

| | |
|---|---|
| Film thickness, mils | 1.1 |
| Konig pendulum hardness after 1 day | 183 |
| Konig pendulum hardness after 5 days | 185 |
| Pencil film hardness after 5 days | H - 2H |
| 40° C. Cleveland humidity resistance (after 1 day of post cure) | |
| Adhesion, initial | 5B |
| Adhesion, 3 days | 5B |
| Adhesion, 7 days | 5B |
| Adhesion, 10 days | 5B |
| Blistering, 3 days | 10 |
| Blistering, 7 days | 10 |
| Blistering, 10 days | 10 |
| Chemical resistance (after 5 day of post cure), covered 20 hours at 22° C. | |
| 10% NaOH(aq.) | No attack |
| 10% H$_2$SO$_4$(aq.) | No attack |
| 50% Ethanol (aq.) | No attack |

TABLE 4-continued

Plastic Coating Performance of Low Temperature Cure Coating Formulation

| | |
|---|---|
| Water BABIES ® Sunblock lotion 45SPF, swelling | Slightly |
| Water BABIES ® Sunblock lotion 45SPF, adhesion | 5B |
| Skydrol ® 500B-4, swelling | Slightly |

Further formulations were tested as listed in table 5 (mass of components of the formulations in g) to compare the influence of basicity in the amine:

TABLE 5

Low Temperature Cure Coating Formulations with Amine of Different pKa or Basicity

| | Formulation | | | | | |
|---|---|---|---|---|---|---|
| | #6 | #7 | #8 | #9 | #10 | #11 |
| Acrylic Resin of Example 2 | 126.4 | 126.4 | 126.4 | 126.4 | 126.4 | 126.4 |
| Crosslinker Resin of Example 1.2 | 17.6 | 17.6 | 17.6 | 17.6 | 17.6 | 17.6 |
| Butyl Acetate | 15.0 | 15.0 | 15.0 | 15.0 | 15.0 | 15.0 |
| Xylenes | 15.0 | 15.0 | 15.0 | 15.0 | 15.0 | 15.0 |
| 1-Methoxy-2-propyl acetate (PMA) | 10.0 | 10.0 | 10.0 | 10.0 | 10.0 | 10.0 |
| Aromatic 100 | 5.0 | 5.0 | 5.0 | 5.0 | 5.0 | 5.0 |
| Dow Corning Paint Additive #57, 10% in PMA/Xylene | 1.0 | 1.0 | 1.0 | 1.0 | 1.0 | 1.0 |
| CYCAT 600 | 1.4 | 1.4 | 1.4 | 1.4 | 1.4 | 1.4 |
| 4-Picoline (pKa = 6.0) | 0.3 | 0.0 | 0 | 0 | 0 | 0 |
| N-Methylmorpholine (pKa = 7.4) | 0.0 | 0.4 | 0 | 0 | 0 | 0 |
| Morpholine (pKa = 8.3) | 0.0 | 0.0 | 0.32 | 0 | 0.31 | 0 |
| 2-Amino,2-Methyl Propanol (pKa = 9.8) | 0 | 0 | 0 | 0.32 | 0 | 0 |
| N,N-Dimethylethanolamine (pKa = 9.9) | 0 | 0 | 0 | 0 | 0.32 | 0 |
| Di-n-propylamine (pKa = 11.0) | 0 | 0 | 0 | 0 | 0 | 0.37 |
| Xylene | 2.28 | 2.20 | 2.25 | 2.25 | 1.93 | 2.20 |

Formulation No. 11 (using di-n-propylamine) is a comparative test. The results are listed in Table 6:

TABLE 6

Performance of Amine for One Package Coating Systems
Substrate: ED primed cold roll steel
Film thickness: 1.2 mils = 30 µm

| | Formulation | | | | | |
|---|---|---|---|---|---|---|
| | #6 | #7 | #8 | #9 | #10 | #11 |
| Baked at 80° C. for thirty minutes | | | | | | |
| Konig Pendulum Hardness | 159 | 55 | 55 | 50 | 34 | 33 |
| MEK Double rubs | 200+ | <10[1] | <10 | <10 | <10 | <10 |
| Baked at 90° C. for thirty minutes | | | | | | |
| Konig Pendulum Hardness | 164 | 76 | 144 | 144 | 34 | 33 |
| MEK Double rubs | 200+ | 50[1] | 200 | 200 | <10[1] | <10[1] |

The following conclusions can be made:

Amines with a pKa of from 4.6 to 11.0 were also investigated. All initial experiments were done based on a mass of solids ratio of Acrylic Resin of Example 2/Crosslinker Resin of Example 1.2/DDBSA=82.4/17.6/1.0 applied on electrophoretic deposition ("ED") primed cold rolled steel sheets ("CRS") with a dry film thickness of 1.2 mils (30 µm) and baked at 80° C. for thirty minutes initially. We found only the control system formulated with 4-picoline blocked DDBSA fully cured with a MEK rubs resistance of more that 200. None of the amine blocked DDBSA systems where amines were used which did not obey the pKa range condition yielded more than 10 MEK rubs solvent resistance. By increasing the cure schedule to 90° C. during thirty minutes, the systems formulated with morpholine and AMP systems cured adequately with 200 double MEK rubs solvent resistance which was not good as the 4-picoline control system. Test sheets coated with formulations where the blocking amine was N-methylmorpholine (50 MEK rubs), dimethyl ethanolamine (<10 MEK rubs) and di-n-propylamine (<10 MEK rubs) did not cure properly. In addition, N-methylmorpholine, DMEA, and DPA films had serious wrinkling problem.

An unexpected benefit of using amines obeying the conditions of claim 1 for this polyol melamine coating formulations is eliminating the propensity of formation of wrinkled films as noticed on N-methylmorpholine, and N,N-dimethylethanolamine (DMEA) systems.

Di-n-propylamine (DPA) is the amine preferentially used in U.S. Pat. No. 7,619,019 B2. It is very basic (pKa=11.0) and volatile (RER=157); it is suspected that it cannot cure adequately and yet can create wrinkle film problem. This is not suitable for low temperature cure coating systems at all. Moreover, the mole ratio (amount-of-substance ratio) of volatile amine to unblocked acid catalyst of from 0.02 mol/mol to 0.09 mol/mol as claimed in claim 1 of this patent was found to lead to unsatisfactory results.

From the knowledge learned, other low pKa amines were further investigated. The pKa values for 4-chloroaniline, 4-ethylaniline, and N-ethylaniline are 4.0, 4.6, and 5.1 respectively. Their RER values are less than 5. These extremely low RER blocking amines were hitherto believed to be not suitable for low temperature cure coating formulations, because these amines were believed not to evaporate from the film and should have slowed down the cure response significantly on these low temperature cure schedules. If an amine does not evaporate from the film, it can form a salt to cause inferior humidity resistance. Surprisingly, all of the formulations (Table 7, mass of components in g) cure as well or even better than the 4-picoline comprising formulation. And all the formulations comprise of very low RER amine have the same superior two weeks of 60° C. Cleveland humidity resistance (Table 8). This means the RER is not a critical factor for selecting an amine to block an acid catalyst, low RER of less than 30 unexpectedly leading to good results for the coating film. This is just contrary to what industry has believed, as judged from the U.S. Pat. No. 7,619,019 B2.

TABLE 7

Low Temperature Cure Coating Formulations
with Amine of Different RER

| Formulation | #12 | #13 | #14 | #15 |
|---|---|---|---|---|
| Acrylic Resin of Example 2 | 126.4 | 126.4 | 126.4 | 126.4 |
| Crosslinker Resin of Example 1.2 | 17.6 | 17.6 | 17.6 | 17.6 |
| Butyl Acetate | 15.0 | 15.0 | 15.0 | 15.0 |
| Xylenes | 15.0 | 15.0 | 15.0 | 15.0 |
| 1-Methoxy-2-propyl acetate (PMA) | 10.0 | 10.0 | 10.0 | 10.0 |
| Aromatic 100 | 5.0 | 5.0 | 5.0 | 5.0 |
| Dow Corning Paint Additive #57, 10% in PMA/Xylene | 1.0 | 1.0 | 1.0 | 1.0 |
| CYCAT 600 | 1.4 | 1.4 | 1.4 | 1.4 |
| 4-Picoline (RER = 32) | 0.29 | 0.0 | 0 | 0 |
| 4-chloroaniline (RER = 0.5) | 0.0 | 0.47 | 0 | 0 |
| 4-Ethyl Aniline (RER = 1) | 0.0 | 0.0 | 0.44 | 0 |
| N-Ethyl Aniline (RER = 3) | 0 | 0 | 0 | 0.44 |
| Xylene | 2.28 | 2.23 | 2.13 | 2.13 |

TABLE 8

Low Temperature Cure Coating Formulations
with Amine of Different RER

| Formulation | #12 | #13 | #14 | #15 |
|---|---|---|---|---|
| Konig Pendulum Hardness Development | | | | |
| 60° C.; 30 min bake, 1 day post cure | 76 | 92 | 75 | 84 |
| 70° C.; 30 min bake, 1 day post cure | 125 | 138 | 132 | 143 |
| 80° C.; 30 min bake, 1 day post cure | 158 | 159 | 161 | 164 |
| 60° C.; 30 min bake, 3 day post cure | 88 | 105 | 87 | 97 |
| 70° C.; 30 min bake, 3 day post cure | 131 | 143 | 137 | 151 |
| 80° C.; 30 min bake, 3 day post cure | 162 | 163 | 167 | 166 |
| 60° C.; 30 min bake, 7 day post cure | 108 | 127 | 106 | 118 |
| 70° C.; 30 min bake, 7 day post cure | 141 | 151 | 147 | 157 |
| 80° C.; 30 min bake, 7 day post cure | 164 | 166 | 168 | 168 |
| 60° C. Cleveland Humidity Resistance | | | | |
| Gloss, 20°/60°, initial | 83/89 | 81/88 | 81/88 | 82/89 |
| Gloss, 20°/60°, 7 days | 81/88 | 81/88 | 81/88 | 82/89 |
| Gloss, 20°/60°, 14 days | 82/89 | 80/88 | 80/88 | 81/88 |
| 70° C.; 30 min bake, 7 day post cure | | | | |
| Gloss, 20°/60°, initial | 82/89 | 83/89 | 81/87 | 82/88 |
| Gloss, 20°/60°, 7 days | 82/88 | 81/88 | 82/87 | 82/89 |
| Gloss, 20°/60°, 14 days | 82/88 | 82/88 | 82/88 | 82/89 |
| 80° C.; 30 min bake, 7 day post cure | | | | |
| Gloss, 20°/60°, initial | 83/89 | 83/89 | 83/89 | 83/89 |
| Gloss, 20°/60°, 7 days | 82/89 | 82/89 | 82/88 | 82/89 |
| Gloss, 20°/60°, 14 days | 82/89 | 82/89 | 82/88 | 82/89 |

The invention claimed is:

1. A coating composition comprising at least one aminoplast crosslinker resin A, binder resins B, and a catalyst composition C,
   wherein the catalyst composition C is a mixture of an organic sulfonic acid C1, and an amine C2 selected from the group consisting of 4-chloroaniline, p-ethylaniline, 4-picoline, and N-ethyl aniline,
   wherein the binder resins B are hydroxy-functional polymers selected from the group consisting of alkyd resins, polyester resins, acrylic resins, acrylic-alkyd hybrids or acrylic-polyester hybrids, polyolefin polymers, and polyurethane polymers, wherein the polyurethane polymers are selected from the group consisting of polyether-polyurethanes, polyester-polyurethanes, polycarbonate-polyurethanes, and polyolefin-polyurethanes, and
   wherein the organic sulfonic acid C1 is an aromatic sulfonic acid having at least one sulfonic acid group, —$SO_3H$, bound to an aromatic carbon atom.

2. The coating composition of claim 1 wherein the at least one aminoplast crosslinker resin A comprises at least one at least partially etherified reaction product of melamine and formaldehyde wherein a ratio of an amount of substance $n(CH_2O)$ of combined formaldehyde to an amount of substance n(Mel) of melamine is in the range of from 4.5 mol/mol to 6.2 mol/mol, a ratio of an amount of substance n(RO) of alkyl ether groups in the aminoplast crosslinker resin A to the amount of substance n(Mel) of melamine is in the range of from 4 mol/mol to 6.0 mol/mol, and a mass fraction of monomers is in the range of from 30% to 65%, calculated as a ratio of a mass m(1) of monomers to the total mass m(A) of the aminoplast crosslinker resin A, excluding solvents, additives, and catalysts.

3. The coating composition of claim 1 wherein at least two aminoplast crosslinker resins A1 and A2 are present in the coating composition.

4. The coating composition of claim 3 wherein one of the aminoplast crosslinker resins, A1, comprises at least one at least partially etherified reaction product of melamine and formaldehyde wherein a ratio of an amount of substance $n(CH_2O)$ of combined formaldehyde to an amount of substance n(Mel) of melamine is in the range of from 5.55 mol/mol to 6.2 mol/mol, a ratio of an amount of substance n(RO) of alkyl ether groups in the aminoplast crosslinker resin A to the amount of substance n(Mel) of melamine is in the range of from 5 mol/mol to 5.6 mol/mol, and a mass fraction of monomers is in the range of from 35% to 55%, calculated as a ratio of a mass m(1) of monomers to the total mass of the aminoplast crosslinker resin A1, excluding solvents, additives, and catalysts.

5. The coating composition of claim 3 wherein one of the aminoplast crosslinker resins, A2, comprises at least one at least partially etherified reaction product of melamine and formaldehyde wherein a ratio of an amount of substance $n(CH_2O)$ of combined formaldehyde to an amount of substance n(Mel) of melamine is in the range of from 5.75 mol/mol to 6.5 mol/mol, a ratio of n amount of substance n(RO) of alkyl ether groups in the aminoplast crosslinker resin A2 to the amount of substance n(Mel) of melamine is in the range of from 4.5 mol/mol to 5.9 mol/mol, and a mass fraction of monomers is in the range of from 55% to 95%, calculated as a ratio of a mass m(1) of monomers to the total mass m(A) of the aminoplast crosslinker resin A2, excluding solvents, additives, and catalysts.

6. The coating composition of claim 3 wherein a ratio of the mass m(A1) of the aminoplast crosslinker resin A1 to the mass m(A2) of the aminoplast crosslinker resin A2 is from 5: 5 to 9: 1.

7. The coating composition of claim 1, wherein the at least one aminoplast crosslinker resin A has alkyl ether groups comprising at least two different alkyl groups.

8. The coating composition of claim 1, wherein the organic sulfonic acid C1 is selected from the group consisting of toluene sulfonic acid, dodecylbenzene sulfonic acid, dinonylnaphthalene sulfonic acid, dinonylnaphthalene disulfonic acid, and mixtures thereof.

9. A process for preparing the coating composition of claim 1, which process comprises
   in a first step, preparing the catalyst composition C by mixing the organic sulfonic acid C1, optionally dissolved in an organic solvent selected from aliphatic linear or branched alcohols having from one to six carbon atoms, with the amine C2 selected from the group consisting of 4-chloroaniline, p-ethylaniline, 4-picoline, and N-ethyl aniline, in a second step, admixing the catalyst composition C to an aminoplast crosslinker resin A, to form a mixture AC, and in a third step, admixing the mixture AC to the binder resins B, or a solution of the binder resins B in an inert solvent L, wherein organic sulfonic acid C1 is an aromatic sulfonic acid having at least one sulfonic acid group, —$SO_3H$, bound to an aromatic carbon atom.

10. The process of claim 9 wherein a ratio of an amount of aminic nitrogen atoms in the amine C2 to an amount of acidic hydrogen atoms in the organic sulfonic acid C1 is between 1.0 mol/mol and 1.5 mol/mol.

11. The process of claim 9, wherein the organic sulfonic acid C1 is selected from the group consisting of toluene sulfonic acid, dodecylbenzene sulfonic acid, dinonylnaphthalene sulfonic acid, dinonylnaphthalene disulfonic acid, and mixtures thereof.

12. A method of use of the coating composition as claimed in claim 1, which method comprises the steps of
coating a substrate with the coating composition of claim 1 to prepare a coating film on the substrate, and
curing the coating film by applying heat to provide a curing temperature between 50° C. and 100° C.

* * * * *